US012491579B2

(12) United States Patent
Ohno

(10) Patent No.: US 12,491,579 B2
(45) Date of Patent: Dec. 9, 2025

(54) OPTICAL MACHINING APPARATUS

(71) Applicant: KABUSHIKI KAISHA TOSHIBA, Tokyo (JP)

(72) Inventor: Hiroshi Ohno, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 356 days.

(21) Appl. No.: 17/185,929

(22) Filed: Feb. 25, 2021

(65) Prior Publication Data
US 2022/0080528 A1  Mar. 17, 2022

(30) Foreign Application Priority Data

Sep. 16, 2020 (JP) ................... 2020-155057

(51) Int. Cl.
B23K 26/36 (2014.01)
B23K 26/06 (2014.01)

(52) U.S. Cl.
CPC .......... B23K 26/36 (2013.01); B23K 26/0604 (2013.01); B23K 26/0619 (2015.10)

(58) Field of Classification Search
CPC ............................ B23K 26/0619; B23K 26/36
See application file for complete search history.

(56) References Cited

U.S. PATENT DOCUMENTS 4,689,467 A * 8/1987 Inoue ................. B23K 26/0665
219/121.84
8,309,474 B1 * 11/2012 Wang ................ H01L 21/02686
438/795
9,455,185 B1 * 9/2016 Gluschenkov ............ C22F 1/18
10,369,661 B2 * 8/2019 Ohno ................... B23K 26/342
10,732,102 B2   8/2020 Ohno et al.
(Continued)

FOREIGN PATENT DOCUMENTS

DE       4239555 A1 *  7/1993 ......... B23K 26/0648
DE     19616327 A1 * 11/1997 ......... B23K 26/0608
(Continued)

OTHER PUBLICATIONS

DE 19616327 A1 (Trinks Ulla DR) Nov. 13, 1997 [retrieved on Nov. 30, 2023]. Retrieved from Espacenet Database, translation by EPO and Google. (Year: 1997).*
(Continued)

*Primary Examiner* — Ibrahime A Abraham
*Assistant Examiner* — Franklin Jefferson Wang
(74) *Attorney, Agent, or Firm* — Finnegan, Henderson, Farabow, Garrett & Dunner, LLP

(57) ABSTRACT

According to one embodiment, an optical machining apparatus includes a first light source, and a second light source. The first light source is configured to radiate a first beam onto a first position of a surface of a work in such a manner as to transfer heat at a temperature lower than a melting temperature of the work from the first position of the work to a second position of a surface of the work on an opposite side to the first position. The second light source is configured to radiate a second beam onto the second position such that a temperature of the work exceeds the melting temperature of the work, in a state in which a temperature of the second position is raised by the transfer of the heat.

15 Claims, 11 Drawing Sheets

(56) References Cited

U.S. PATENT DOCUMENTS

| | | | | |
|---|---|---|---|---|
| 2005/0029240 | A1* | 2/2005 | Dugan | B23K 26/57 |
| | | | | 219/121.84 |
| 2005/0170572 | A1* | 8/2005 | Hongo | B23K 26/0738 |
| | | | | 250/341.1 |
| 2011/0139759 | A1* | 6/2011 | Millman, Jr. | B23K 26/0823 |
| | | | | 219/121.72 |
| 2012/0074117 | A1* | 3/2012 | Ramappa | B23K 26/0006 |
| | | | | 219/200 |
| 2013/0087543 | A1* | 4/2013 | Denney | B23K 9/23 |
| | | | | 219/136 |
| 2016/0318121 | A1* | 11/2016 | Lim | B23K 26/361 |
| 2017/0259767 | A1* | 9/2017 | Johnson | B23K 26/0846 |
| 2017/0282266 | A1* | 10/2017 | Harrer | B23K 26/0619 |
| 2022/0234144 | A1* | 7/2022 | Mori | B23K 26/14 |

FOREIGN PATENT DOCUMENTS

| | | | |
|---|---|---|---|
| JP | H8-309573 A | 11/1996 | |
| JP | 2004-291026 A | 10/2004 | |
| JP | 2005-217213 A | 8/2005 | |
| JP | 2019-124542 A | 7/2019 | |
| WO | WO-9323196 A1 * | 11/1993 | B23K 26/03 |

OTHER PUBLICATIONS

WO 9323196 A1 (Beyer Eckhard) Nov. 25, 1993 [retrieved on Nov. 30, 2023]. Retrieved from Espacenet Database, translation by EPO and Google. (Year: 1993).*

* cited by examiner

ID1 OPTICAL MACHINING APPARATUS

CROSS-REFERENCE TO RELATED APPLICATIONS

This application is based upon and claims the benefit of priority from Japanese Patent Application No. 2020-155057, filed Sep. 16, 2020, the entire contents of all of which are incorporated herein by reference.

FIELD

Embodiments of the present invention relate to an optical machining apparatus.

BACKGROUND

A laser machining technology is carried out with no contact with a work, and there is no concern of wear of a tool. Thus, the range of applications of the laser machining technology is increasing in various industries. In the laser machining technology, it is known that, in some cases, a machined part is contaminated by a spatter occurring due to a sharp heat input to a work at a time of laser machining. In order to prevent the spatter occurring on the work, a method of using a ring-shaped beam is known as a laser machining technology.

DETAILED DESCRIPTION

According to one embodiment, an optical machining apparatus includes a first light source, and a second light source. The first light source is configured to radiate a first beam onto a first position of a surface of a work in such a manner as to transfer heat at a temperature lower than a melting temperature of the work from the first position of the work to a second position of a surface of the work on an opposite side to the first position. The second light source is configured to radiate a second beam onto the second position such that a temperature of the work exceeds the melting temperature of the work, in a state in which a temperature of the second position is raised by the transfer of the heat.

An object of the present embodiments is to provide an optical machining apparatus configured to reduce the occurrence of a spatter at a time of machining the work.

Hereinafter, optical machining apparatuses 10 according to embodiments will be described with reference to the accompanying drawings. The drawings are schematic or conceptual ones, and the relationship between the thickness and width of each part, and the ratio in size between parts, etc. do not necessarily agree with the actual ones. Even when identical parts are depicted, the parts may be depicted with different dimensions and ratios between the drawings. In the present specification and drawings, the elements similar to those described in connection with preceding drawings are denoted by like reference signs, and a detailed description thereof is omitted unless where necessary.

First Embodiment

Figure 1:
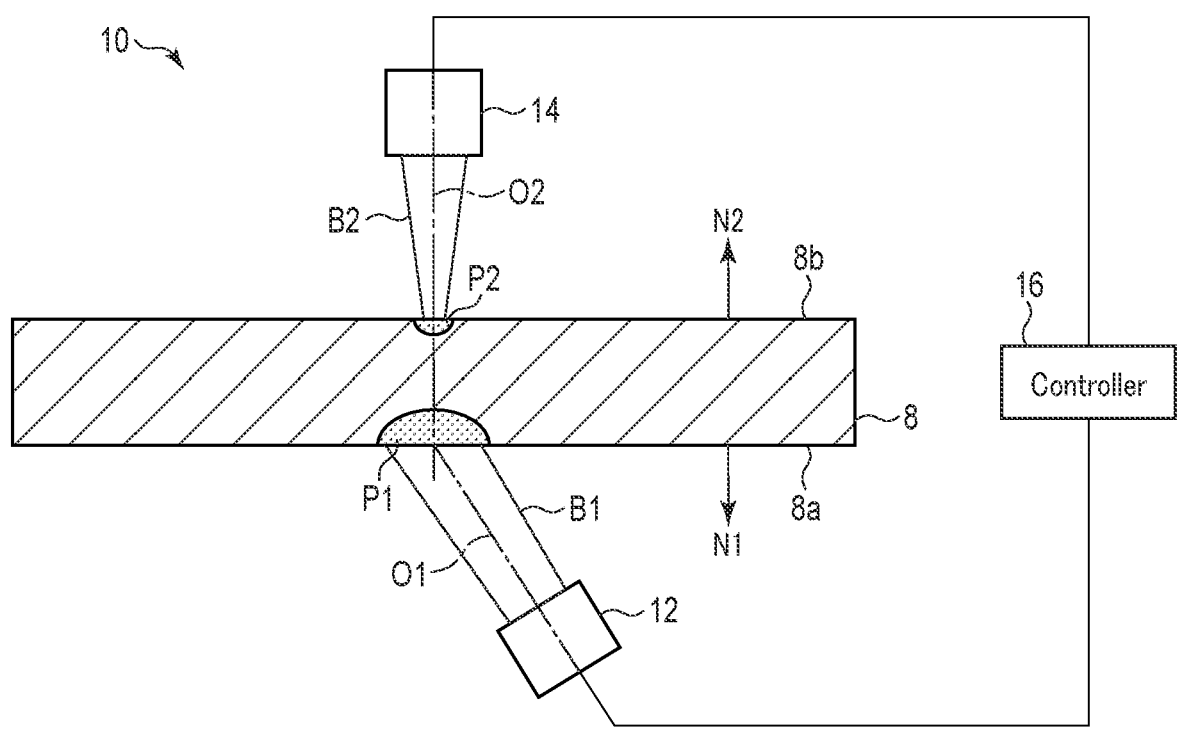
FIG. 1 is a schematic view illustrating a state in which a work is being machined by using an optical machining apparatus according to a first embodiment.

FIG. 1 is a schematic view of an optical machining apparatus 10 according to a first embodiment. It is assumed that the optical machining apparatus 10 of FIG. 1 is situated in a plane along a certain cross section of a work (machining target object) 8.

The optical machining apparatus 10 of the present embodiment includes a first light source 12 which emits a first beam B1 and radiates the first beam B1 onto the work 8, and a second light source 14 which emits a second beam B2 and radiates the second beam B2 onto the work 8. The optical machining apparatus 10 further includes a controller 16. The controller 16 controls the intensity of the first beam B1 which is emitted from the first light source 12, and the intensity of the second beam B2 which is emitted from the second light source 14. The optical machining apparatus 10 according to the present embodiment performs machining for forming a hole of a spot shape of the second beam B2 in the work 8 by using the first beam B1 and the second beam B2.

In the controller 16, for example, a processor such as a CPU loads a control program, which is stored in a memory such as a ROM, into a RAM, and executes the control program. The control of the controller 16 can be realized by a circuit (e.g. ASIC) which implements one or more functions.

The work 8 is a plate member of a metal such as a stainless steel alloy, iron, copper, brass, a titanium alloy, or an aluminum alloy. The work 8 is not limited to the metallic member, and a material, which can be machined in a non-contact manner, is used for the work 8.

In the present embodiment, for the purpose of simple description, it is assumed that the work 8 has a planar front surface 8*b* and a planar back surface 8*a*, and normal lines N1 and N2 of the respective surfaces 8*a* and 8*b* extend in opposite directions. Specifically, the front surface 8*b* and back surface 8*a* of the work 8 are parallel. It is assumed that a distance between the front surface 8*b* and back surface 8*a* is a thickness.

In the present embodiment, for example, a YAG laser oscillator is used as the first light source 12. It is assumed that the first beam B1 is a laser beam from the YAG laser oscillator, and the wavelength of the first beam B1 is, for example, 1064 nm. Aside from this, however, the first beam B1 may be any kind of electromagnetic waves, and may be, for example, X-rays, deep ultraviolet, ultraviolet, visible light, infrared, near infrared, far infrared, millimeter waves, or microwaves. Thus, the first beam B1 is not limited to the laser beam, and may be, for example, high-intensity light from an LED. Specifically, the first light source 12 is not limited to the laser oscillator, and a proper light source capable of emitting the above-described high-intensity light can be used as the first light source 12.

The first beam B1 emitted from the first light source 12 is radiated on the back surface 8*a* of the work 8 with a spot-like beam shape. The radiation position of the first beam B1 is a first machining point (first position) P1 of the back surface 8*a* of the work 8. Here, it is assumed that the beam shape of the first beam B1 is an ellipse, a major axis of which is set as the diameter of the first beam B1. Aside from this, however, the beam shape of the first beam B1 may be any shape, such as a circle, a plurality of points, a polygon, or a line. It is assumed that the diameter of the first beam B1 is, for example, 3.0 mm. Aside from this, however, the diameter of the first beam B1 can be set as appropriate.

In the present embodiment, for example, a YAG laser oscillator is used as the second light source 14. It is assumed that the second beam B2 is, for example, a laser beam from the YAG laser oscillator, and the wavelength of the second beam B2 is, for example, 1064 nm. Aside from this, however, the second beam B2 may be any kind of electromagnetic waves, like the first beam B1. Thus, the second beam B2 is not limited to the laser beam, and may be, for example, high-intensity light from an LED. Specifically, the second light source 14 is not limited to the laser oscillator, and a proper light source capable of emitting the above-described high-intensity light can be used as the second light source 14.

The second beam B2 emitted from the second light source 14 is radiated on the front surface 8*b* as a second position of the work 8 with a spot-like beam shape. The radiation position of the second beam B2 is a second machining point (second position) P2 of the front surface 8*b* of the work 8. Here, it is assumed that the beam shape of the second beam B2 is a circle, the diameter of which is the diameter of the second beam B2. Aside from this, however, the beam shape of the second beam B2 may be any shape, such as a circle, a plurality of points, a polygon, or a line. It is assumed that the diameter of the second beam B2 is, for example, 0.5 mm. Aside from this, however, the diameter of the second beam B2 can be set as appropriate.

In the present embodiment, a first beam spot diameter of the first beam B1 on the back surface 8*a* (the diameter of the beam B1 at the radiation position of the first beam B1 on the back surface 8*a* of the work 8) is greater than a second beam spot diameter of the second beam B2 on the front surface 8*b* (the diameter of the beam B2 at the radiation position of the second beam B2 on the front surface 8*b* of the work 8).

Note that it is preferable that the radiation position of the first beam B1 on the back surface 8*a* of the work 8 is located on an optical axis O2 of the second beam B2. It is preferable that an optical axis O1 of the first beam B1 crosses the optical axis O2 of the second beam B2. The radiation position of the first beam B1 may be slightly displaced from the optical axis O2 of the second beam B2.

With the above-described structure, the operation of the optical machining apparatus 10 will be described.

The material and the thickness (heat transfer distance) of the work 8 are known in advance. Thus, heat is transferred from the first machining point P1 to the second machining point P2 in a certain time from a time point at which the first beam B1 is radiated on the work 8. A timing of starting an output of the second beam B2 from the second light source 14, after starting an output of the first beam B1 from the first light source 12, is set in advance for the first light source 12 and the second light source 14. In addition, a time period, during which the emission of the first beam B1 from the first light source 12 is continued, is also set in advance for the first light source 12. A time period, during which the emission of the second beam B2 from the second light source 14 is continued, is also set in advance for the second light source 14.

The controller 16 causes the first light source 12 to emit the first beam B1, and makes the first beam B1 obliquely incident (i.e. obliquely radiates the first beam B1) on the first machining point (first position) P1 of the back surface 8*a* of the work 8, as illustrated in FIG. 1. The beam shape of the first beam B1 on the back surface 8*a* of the work 8 is elliptic. By the incidence of the first beam B1, the temperature of the first machining point P1 of the back surface 8*a* of the work 8 is raised. The heat by the incidence of the first beam B1 on the first machining point P1 of the work 8 spreads three-dimensionally in a semi-ellipsoidal shape from the first machining point P1 by the heat transfer in the work 8 from the first machining point P1. The heat is transferred from the back surface 8*a* to the front surface 8*b*. Specifically, if the first beam B1 is made incident on the machining point P1, the temperature of the work 8 is raised from the back surface 8*a* toward the front surface 8*b*. Note that the controller 16 controls the output intensity of the first beam B1 from the first light source 12, based on the material, thickness and the like of the work 8, and raises the temperature of the work 8 such that substantially no damage is caused to the work 8. Thus, by the first beam B1 from the first light source 12, the temperature of the second machining point P2, which is located on the side opposite to the first machining point P1 of the work 8, is also raised to such a degree that the work 8 suffers substantially no damage. The temperature of the second machining point P2 at this time is set to be lower than the melting temperature of the work 8.

The controller 16 causes the first light source 12 to emit the first beam B1, and causes the second light source 14 to emit the second beam B2 at a timing immediately before, or at the same timing as, or at a timing immediately after the heat by the incidence of the first beam B1 on the first machining point P1 of the work 8 is conveyed from the back surface 8*a* to the front surface 8*b* (i.e. the heat reaches the front surface 8*b* from the back surface 8*a*), thus making the second beam B2 incident on the front surface 8*b* of the work 8.

The second beam B2 is made incident on the front surface 8*b* of the work 8 in a state in which the second beam B2 is orthogonal to the front surface 8*b* of the work 8. The position where the second beam B2 is made incident, i.e. the second machining point P2, is located on the side opposite to the position where the first beam B1 is made incident, i.e. the first machining point P1.

The temperature of the second machining point P2 of the front surface 8b of the work 8, which has been raised by the transfer of the heat from the first beam B1, is further raised by the second beam B2 from the second light source 14. By the heat transfer in the work 8 from the second machining point P2, the heat spreads semi-spherically from the front surface 8b toward the back surface 8a, and is conveyed from the front surface 8b to the back surface 8a. Specifically, when the second beam B2 is made incident on the machining point P2, the temperature of the work 8 is raised in a direction from the front surface 8b toward the back surface 8a.

Here, when the first beam B1 from the first light source 12 is not radiated, the temperature of the second machining point P2 is not raised to the neighborhood of the melting temperature of the work 8. When the first beam B1 from the first light source 12 is radiated, it is possible to reduce the heat input by the second beam B2 from the second light source 14 for raising the temperature of the second machining point P2 up to a predetermined temperature (the melting temperature of the work 8). Specifically, an instantaneous heat input amount by the second beam B2 from the second light source 14 can be reduced. Thereby, the impulse by the sharp thermal expansion of the work 8 due to the instantaneous heat input can be reduced. Accordingly, the damage and deformation in the vicinity of the second machining point P2 of the work 8 can be reduced. Specifically, when the second machining point P2 is machined, the second machining point P2 is preheated by the heat transfer from the first machining point P1, and the occurrence of thermal stress in the work 8 is prevented and the occurrence of residual stress is prevented.

The temperature of the second machining point P2 is raised in advance by the first beam B1 that is emitted from the first light source 12, and thereafter the temperature of the second machining point P2 is raised up to a desired temperature (a temperature exceeding the melting temperature) by the second beam B2 that is emitted from the second light source 14. The energy of the second beam B2, which needs to be emitted from the second light source 14, is smaller when the temperature of the second machining point P2 is raised in advance by the first beam B1 than when the temperature of the second machining point P2 is not raised in advance by the first beam B1. Specifically, by raising the temperature of the second machining point P2 of the front surface 8b of the work 8 by the first beam B1 from the first light source 12, it is possible to reduce the energy that is needed to raise the temperature of the second machining point P2 of the front surface 8b of the work 8 up to the desired temperature by the second beam B2 from the second light source 14. Thus, it is possible to reduce that input heat amount (energy amount) by the second beam B2 from the second light soured 14, which is necessary for properly machining the work 8.

In addition, in the example of the present embodiment, an opening with a diameter of 0.5 mm that is the diameter of the second beam B2, or a recess hole recessing relative to the front surface 8b of the work 8, is formed in accordance with the energy output of the first beam B1 emitted from the first light source 12 and the energy output of the second beam B2 emitted from the second light source 14. Note that when the second beam B2 penetrates the work 8 from the front surface 8b to the back surface 8b and the opening is formed, the first light source 12 does not exist on the optical axis O2 of the second beam B2. Thus, it is possible to prevent the second beam B2 from being radiated onto the first light source 12 of the first beam B1.

In the optical machining apparatus 10 of the present embodiment, by the first beam B1 from the first light source 12, the temperature of the machining position is raised from the back surface 8a side to such a degree that the work 8 does not melt. At this time, the temperatures of the first machining point P1 and second machining point P2 of the work 8 do not reach the melting temperature by the radiation of the first beam B1 onto the first machining point P1 of the work 8. Thus, a spatter due to machining does not occur in the work 8 by only the radiation of the first beam B1 on the first machining point P1 of the work 8. In addition, in the state in which the temperature of the machining position (second machining point P2) is raised from the back surface 8a side to such a degree that the work 8 does not melt, by the first beam B1 from the first light source 12, the second beam B2 from the second light source 14 is radiated and machining is performed by raising the temperature of the second machining point P2 of the work 8 up to the melting temperature or above.

When the work 8 is machined, if the first beam B1 from the first light source 12 is radiated on the work 8, the heat input by the second beam B2 from the second light source 14 can be reduced, compared to the case where the first beam B1 from the first light source 12 is not radiated. Specifically, the instantaneous heat input amount to the front surface 8b of the work 8 by the second beam B2 from the second light source 14 can be reduced. Thereby, the impulse by the sharp thermal expansion of the work 8 due to the instantaneous heat input can be reduced with respect to the second machining point P2 of the work 8. Accordingly, when the work 8 is machined, the optical machining apparatus 10 can reduce the occurrence of a spatter due to the melting of the second machining point P2 of the work 8. In addition, when the work 8 is machined, the optical machining apparatus 10 can reduce the occurrence of dross due to the melting of the second machining point P2 of the work 8.

For example, as one kind of the material of the work 8, an aluminum alloy is regarded as material that is difficult to optically machine, since the aluminum alloy has a high thermal conductivity and a high reflectance. In the present embodiment, the optical machining apparatus 10 raises the temperature of a heat transfer path from the first machining point P1 to second machining point P2 up to a degree lower than the melting temperature by the radiation of the first beam B1 from the first light source 12. In this state, the optical machining apparatus 10 raises the temperature of the second machining point P2 up to the melting temperature or above by the radiation of the second beam B2 from the second light source 14. In the present embodiment, the heat input amount to the second machining point P2 can be made smaller than in the case of machining the second machining point P2 by only the second beam B2. Thus, even when the work 8 is made of a material with a high reflectance, the optical machining apparatus 10 can reduce the heat input amount to the work 8 by the radiation of the second beam B2. Accordingly, even in the case of a material with a high thermal conductivity and a high reflectance, the material can be machined by the optical machining apparatus 10. Besides, at this time, the optical machining apparatus 10 can reduce the occurrence of a spatter due to the melting of the second machining point P2 of the work 8. Furthermore, the optical machining apparatus 10 can reduce the occurrence of dross due to the melting of the second machining point P2 of the work 8 at the time of machining the work 8.

Note that, in the present embodiment, the wavelength of the first beam B1 and the wavelength of the second beam B2 are described as being identical. The wavelength of the first beam B1 and the wavelength of the second beam B2 may be different. When the wavelength of the first beam B1 and the wavelength of the second beam B2 are different, it is preferable that the first wavelength of the first beam B1 is set to have a higher absorptivity to the work 8 prior to melting, than the second wavelength of the second beam B2. In this case, the first wavelength is preferably shorter than the second wavelength.

According to the above-described embodiment, the first light source 12 of the optical machining apparatus 10 radiates the first beam B1 onto the first machining point (first position) P1 in such a manner as to transfer heat at a temperature lower than the melting temperature of the work 8 from the first machining point (first position) P1 of the back surface 8a of the work 8 to the front surface 8b on the opposite side of the work 8. The second light source 14 of the optical machining apparatus 10 radiates the second beam B2 onto the second machining point (second position) P2 on the surface on the opposite side to the first machining point (first position) P1 of the work 8, such that the temperature of the work 8 exceeds the melting temperature of the work 8.

In addition, the controller 16 controls the radiation of the first beam B1 from the first light source 12 and the radiation of the second beam B2 from the second light source 14. The controller 16 causes the second light source 14 to radiate the second beam B2 in accordance with the heat transfer to the second machining point (second position) P2 and the vicinity thereof by the radiation of the first beam B1 from the first light source 12 onto the first machining point (first position) P1.

The controller 16 controls the radiation timing of the first beam B1 from the first light source 12 and the radiation timing of the second beam B2 from the second light source 14. The controller 16 adjusts the radiation timing of the first beam B1 from the first light source 12 and the radiation timing of the second beam B2 from the second light source 14, based on the information of the work 8 (thermal conductivity, thickness (heat transfer distance), and the like).

According to the present embodiment, there can be provided the optical machining apparatus 10 which can reduce the occurrence of a spatter at a time of machining the work 8.

(Modification of the First Embodiment)

Figure 2:
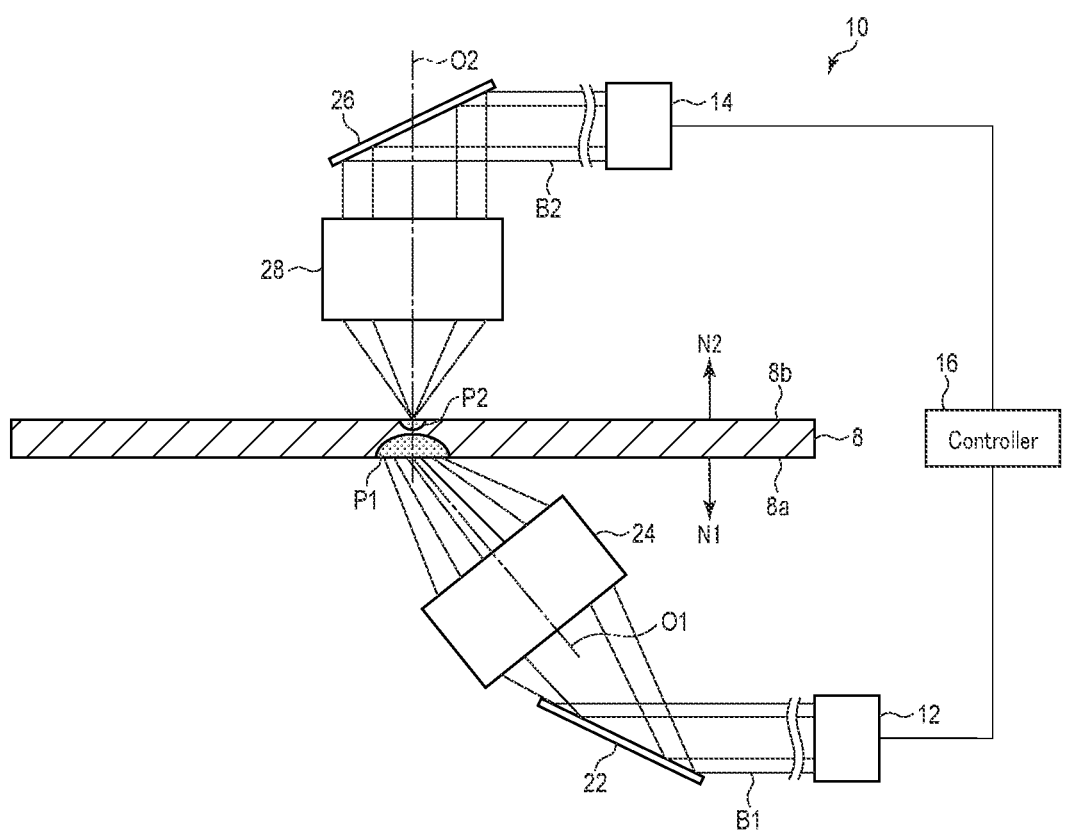
FIG. 2 is a schematic view illustrating a state in which a work is being machined by using an optical machining apparatus according to a modification of the first embodiment.

FIG. 2 illustrates a modification of the optical machining apparatus 10 of the first embodiment.

As illustrated in FIG. 2, a reflection mirror 22 and a condensing lens 24 are disposed between the first light source 12 and the back surface 8a of the work 8. A reflection mirror 26 and a condensing lens 28 are disposed between the second light source 14 and the front surface 8b of the work 8.

The first beam B1 is deflected by the reflection mirror 22 and condensed by the condensing lens 24 to have a first beam spot diameter which is appropriate, and the first beam B1 is radiated on the first machining point P1 of the back surface 8a of the work 8. The second beam B2 is deflected by the reflection mirror 26 and condensed by the condensing lens 28 to have a second beam spot diameter which is appropriate, and the second beam B2 is radiated on the second machining point P2 of the front surface 8b of the work 8.

In this case, the optical machining apparatus 10 can control the optical path of the first beam B1 by using optical elements such as the reflection mirror 22 and condensing lens 24. The optical machining apparatus 10 can control the optical path of the second beam B2 by using optical elements such as the reflection mirror 26 and condensing lens 28. Accordingly, the first light source 12 of the optical machining apparatus 10 may not be situated in a position opposed to the back surface 8a of the work 8, and the second light source 14 may not be situated in a position opposed to the front surface 8b of the work 8. Therefore, the optical machining apparatus 10 can arrange the first light source 12 and second light source 14 as desired.

Second Embodiment

Hereinafter, an optical machining apparatus 10 according to a second embodiment will be described in detail with reference to FIG. 3 to FIG. 6. The present embodiment is a modification of the first embodiment, and members, which are identical to the members described in the first embodiment or have functions identical to the functions of the members described in the first embodiment, are denoted by like reference signs, and a detailed description thereof is omitted.

Figure 3:
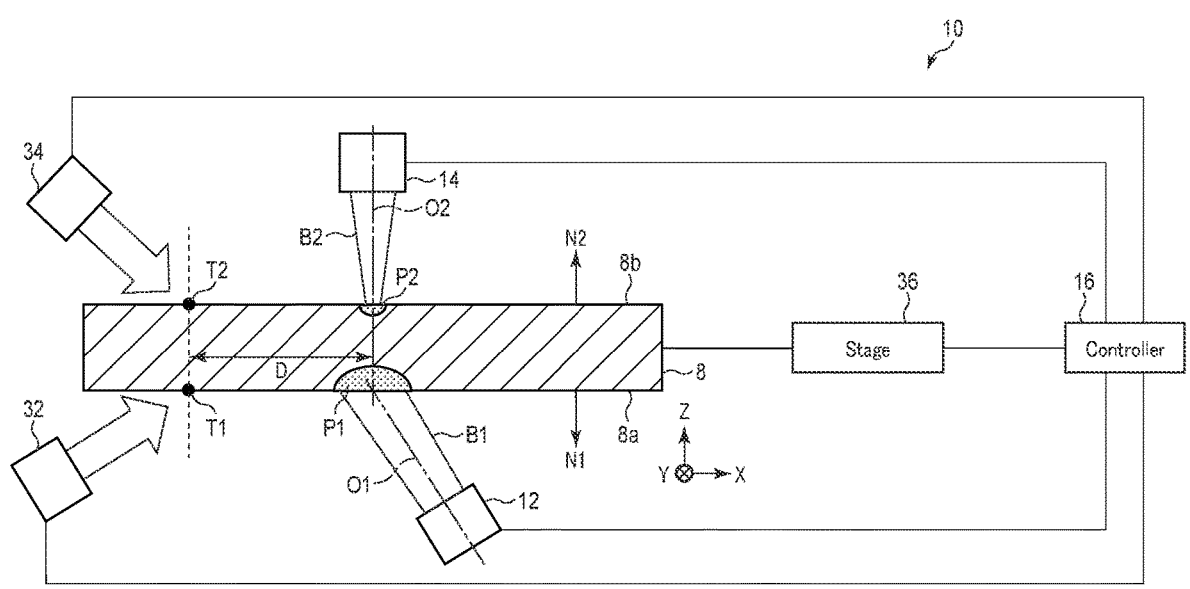
FIG. 3 is a schematic view illustrating a state in which a work is being machined by using an optical machining apparatus according to a second embodiment.

FIG. 3 is a schematic view of the optical machining apparatus 10 of the second embodiment. The optical machining apparatus 10 of this embodiment includes a first light source 12, a second light source 14, a controller 16, temperature monitors 32 and 34, and a stage 36 which moves a work 8. As illustrated in FIG. 3, an XYZ orthogonal coordinate system is adopted.

The stage 36 is used as a moving portion which moves the work 8. The stage 36 may be movable one-dimensionally (linearly), such as in two directions (±X directions), or may be movable in a plane two-dimensionally, such as in four directions (±X directions and ±Y directions). Here, for the purpose of simple description, the case in which the stage 36 moves in one direction is described by way of example. Note that it is preferable that the stage 36 does not move the work 8 in a Z direction.

The controller 16 can control the movement of the stage 36, for example, by the control of an actuator such as a motor (not shown). While moving the work 8 by the stage 36 at a proper speed, the controller 16 controls the first machining point (first position) P1 on which the first beam B1 is radiated, and the second machining point (second position) P2 on which the second beam B2 is radiated, in such a manner as to keep the positional relationship between the first machining point P1 and the second machining point P2.

The work 8 is scanned by the stage 36, for example, in a right direction (+X direction) on the drawing sheet of FIG. 3. Alternatively, the work 8 may be scanned, not in the right direction (+X direction) on the drawing sheet of FIG. 3, but in a left direction (−X direction) on the drawing sheet. Besides, the work 8 may be fixed, and the first beam B1 and second beam B2 may be scanned in the left direction (−X direction) on the drawing sheet. In any of the cases, the optical machining apparatus 10 of the present embodiment is configured to be capable of changing the relative position between the work 8 and the first beam B1 and second beam B2 in a time-series manner.

The temperature monitor 32 of the present embodiment measures a surface temperature of a first temperature measuring point T1 which is distant, by a predetermined distance D, from the first machining point P1, the first temperature measuring point T1 being located on the back surface 8a of the work 8. The temperature monitor 34 measures a surface temperature of a second temperature measuring point T2 which is distant, by the predetermined distance D, from the second machining point P2, the second temperature measuring point T2 being located on the front surface 8b of the work 8. In the present embodiment, the first temperature measuring point T1 is the position of the distance D in the left direction (−X direction) on the drawing sheet of FIG. 3 from the first machining point P1. In this embodiment, the second temperature measuring point T2 is the position of the distance D in the left direction (−X direction) on the drawing sheet of FIG. 3 from the second machining point P2. It is preferable that a thermo-camera (infrared camera), which measures temperatures in a non-contact manner, is used as the temperature monitors 32, 34.

The temperature monitors 32 and 34 are supported, for example, on the stage 36. Thus, the temperature monitors 32 and 34 move together in the direction in which the work 8 is scanned, and continue to measure the temperatures of the temperature measuring points T1 and T2 at the equal distance D from the machining points P1 and P2 of the work 8.

The beam shape (spot shape) of the first beam B1 at the first machining point P1 is, for example, an ellipse, and it is assumed that the length of the major axis of the ellipse is the diameter of the first beam B1 (first beam spot diameter). It is assumed that the major axis of the ellipse of the first beam B1 extends in a direction along the scan direction. However, the spot shape and spot diameter of the first beam B1 are not limited to these examples, and can freely be set.

The beam shape (spot shape) of the second beam B2 at the second machining point P2 is, for example, a circle. It is assumed that the spot diameter of the second beam B2 at the second machining point P2 is a typical dimension of the spot which the second beam B2 forms on the front surface 8b of the work 8. For example, it is assumed that the diameter of the circle formed on the front surface 8b of the work 8 by the radiation of the second beam B2 is the spot diameter. However, the spot shape and spot diameter of the second beam B2 are not limited to these examples, and can freely be set.

It is assumed that the first beam B1 and the second beam B2 are positioned on opposite sides, with the work 8 being interposed. Specifically, the radiation position of the first beam B1 on the back surface 8a of the work 8 is located on the optical axis O2 of the second beam B2. It is assumed that the first beam spot diameter of the first beam B1 is greater than the second beam spot diameter of the second beam B2.

Note that the radiation position (first machining point P1) of the first beam B1 may be slightly displaced from the optical axis O2 of the second beam B2, if the temperature of the second machining point P2 can be raised up to a settable, desired temperature or above, which is lower than the melting temperature of the second machining point P2, by the radiation of the first beam B1 onto the radiation position.

The operation of the optical machining apparatus 10 of the present embodiment will be described.

Figure 5:
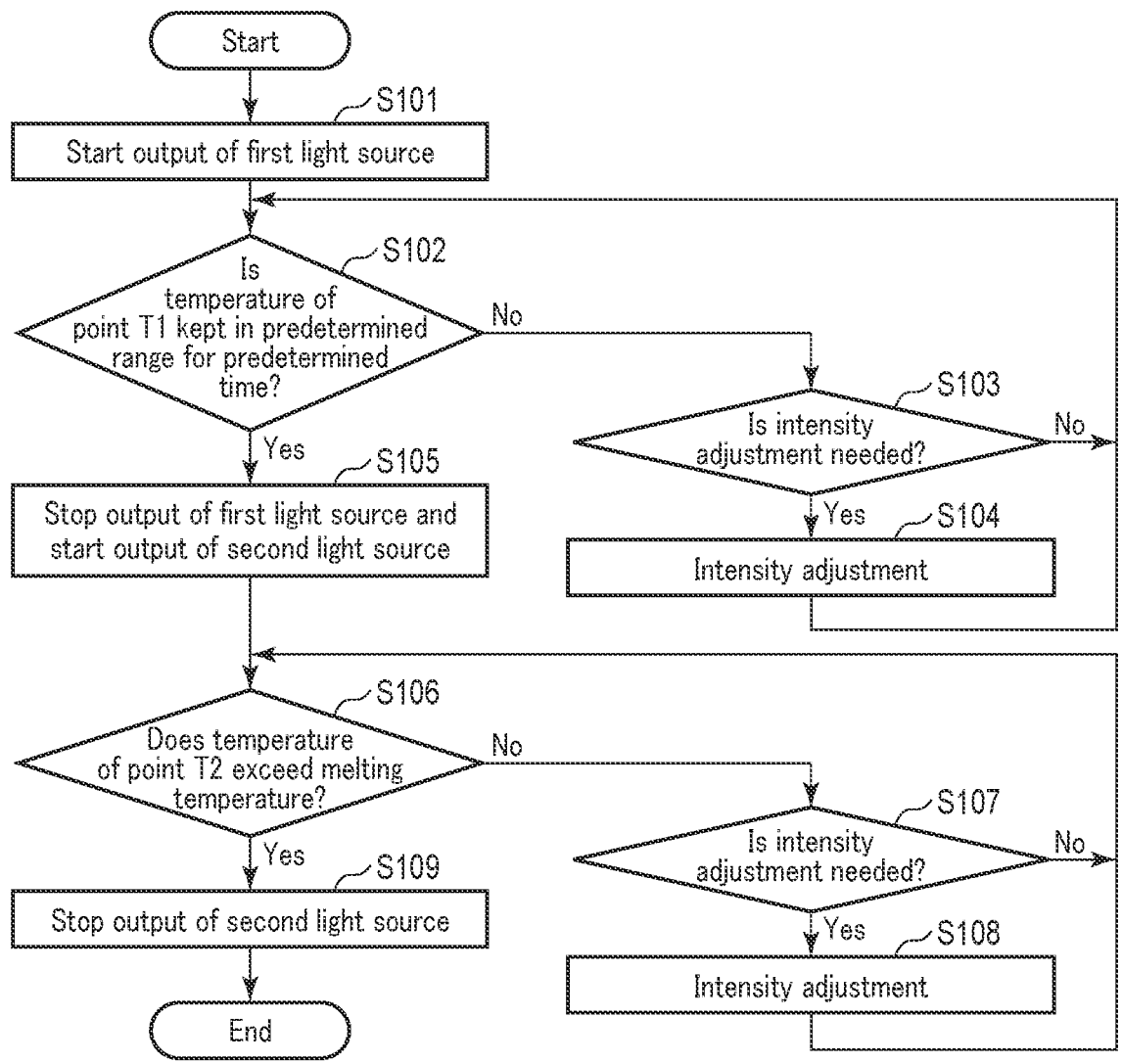
FIG. 5 is a flowchart in a case of machining a fixed work by using the optical machining apparatus according to the second embodiment.

To begin with, the case in which the work 8 is fixed, i.e. the stage 36 is fixed, will be described by way of example with reference to FIG. 5.

Figure 4:
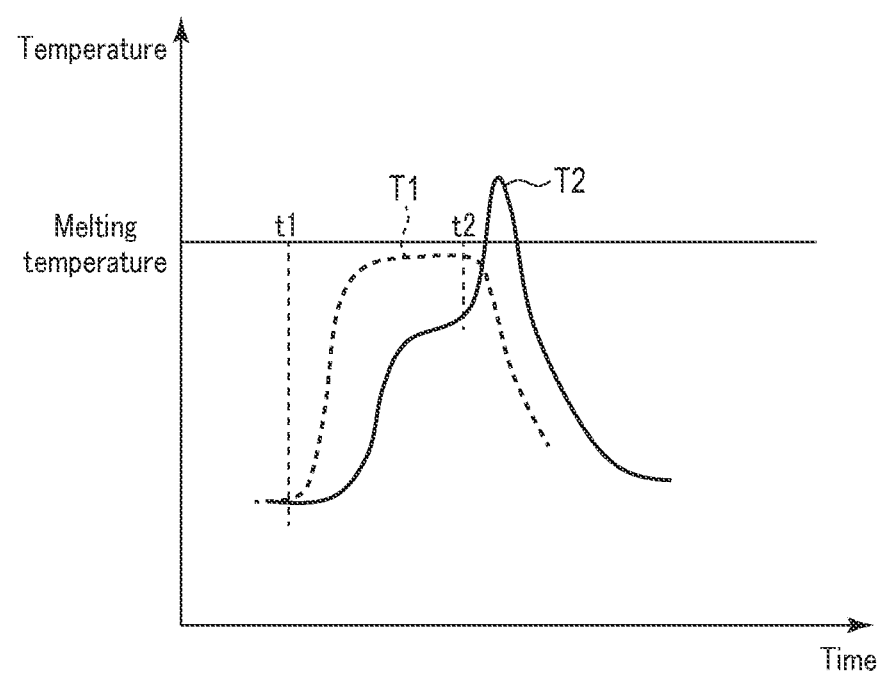
FIG. 4 is a graph showing a relationship between time and a temperature at certain temperature measurement points on a front surface and a back surface of a work, when the work is being machined by using the optical machining apparatus illustrated in FIG. 3.

In FIG. 3, the first temperature measuring point T1 of the work 8 is present on the back surface 8a of the work 8, and the second temperature measuring point T2 is present on the front surface 8b of the work 8. The positional relationship between the first temperature measuring point T1 and the second temperature measuring point T2 is such that the point T1 and the point T2 are located on opposite sides with respect to the work 8. FIG. 4 shows time-series variations of temperatures when the temperatures of the points T1 and T2 are measured by using the temperature monitors 32 and 34.

Note that the melting temperature in FIG. 4 is not a temperature at which the work 8 actually melts at the first machining point P1 or second machining point P2, but is an estimated temperature which is calculated from the thermal conductivity, distance D and the like of the work 8 at a time when the temperature at the first machining point P1 has reached the temperature at which the work 8 melts.

When the work 8 is machined, the controller 16 starts the radiation of the first beam B1 from the first light source 12 (step S101). In accordance with the heat transfer distance from the first machining point P1 to the first temperature measuring point T1, the temperature of the first temperature measuring point T1 begins to rise at time t1 from the start of the radiation of the first beam B1 from the first light source 12. The temperature of the first temperature measuring point T1 rises up to a neighborhood of the melting temperature of the work 8 by the heat transfer from the first machining point P1 by the first beam B1. The temperature of the first temperature measuring point T1 does not exceed the melting temperature of the work 8 for some time, and is kept near the melting temperature of the work 8.

The temperature of the second temperature measuring point T2 gradually rises with a time lag from the temperature of the first temperature measuring point T1, by the heat transfer from the first machining point P1 by the first beam B1.

The controller 16 determines whether the temperature of the first temperature measuring point T1 is kept in a predetermined range for a predetermined time (step S102).

If the temperature of the first temperature measuring point T1 is not kept in the predetermined range for the predetermined time (step S102—No), the controller 16 determines whether the intensity of the first beam B1 emitted from the first light source 12 is proper or not (step S103). If the intensity is not proper and intensity adjustment is needed (step S103—Yes), the controller 16 adjusts the intensity of the first beam B1 emitted from the first light source 12 (step S104). If the intensity is proper and intensity adjustment is not needed (step S103—No), the controller 16 keeps the intensity of the first beam B1 emitted from the first light source 12.

Using as a trigger the fact that the temperature of the first temperature measuring point T1 is kept in the predetermined range for the predetermined time (step S102—Yes), the controller 16 stops the radiation of the first beam B1 from the first light source 12 at time t2 and starts the radiation of the second beam B2 from the second light source 14 at time t2 (step S105). The temperature of the first temperature measuring point T1 lowers immediately after the stop of the radiation of the first beam B1 from the first light source 12.

By the heat input to the second machining point P2 by the radiation of the second beam B2 with a proper intensity, the temperature of the second temperature measuring point T2 rises and exceeds the melting temperature. When the controller 16 determines that the temperature of the second temperature measuring point T2 does not exceed the melting temperature (step S106—No), the controller 16 determines whether the intensity of the second beam B2 emitted from the second light source 14 is proper or not (step S107). If intensity adjustment is needed and the intensity is not proper (step S107—Yes), the controller 16 adjusts the intensity of the second beam B2 emitted from the second light source 14 (step S108). If intensity adjustment is not needed and the intensity is proper (step S107—No), the controller 16 keeps the intensity of the second beam B2 emitted from the second light source 14.

When the controller 16 determines that the temperature of the second temperature measuring point T2 exceeds the melting temperature (step S106—Yes), the controller 16 stops the radiation of the second beam B2 from the second light source 14 (step S109).

Thus, the temperature of the second temperature measuring point T2 lowers, upon the stop of the radiation of the second beam B2 from the second light source 14.

In this case, an opening with a diameter of 0.5 mm, which is the diameter of the second beam B2, is formed in the work 8. In addition, when the second beam B2 penetrates the work 8 from the front surface 8*b* to the back surface 8*a*, the second beam B2 is prevented from being radiated on the first light source 12 of the first beam B1.

Next, referring to FIG. 6, a description will be given of, by way of example, the case in which a hole of a straight-line shape is formed in the work 8, or the case in which the work 8 is cut, while the work 8 is scanned by the stage 38 in the right direction (+X direction) on the drawing sheet of FIG. 3. Here, the case of forming a hole of a straight-line shape with a predetermined length from a freely chosen position of the work 8 will be described by way of example. Here, an example of the control of the controller 16 of the optical machining apparatus 10 will be described.

Note that, with the movement of the work 8 by the stage 36, the temperature monitors 32 and 34 continue to measure the temperatures of the temperature measuring points T1 and T2 at the equal distance D from the machining points P1 and P2 of the work 8. Specifically, the temperature measuring points T1 and T2 vary relative to the work 8.

A movement distance of the work 8 by the movement of the stage 36 is set in advance.

When the work 8 is machined, the controller 16 starts the radiation of the first beam B1 from the first light source 12 (step S201). Note that, in the flowchart of FIG. 6, the process of step S201 to step S204 is the same as the process of step S101 to step S104 in the flowchart of FIG. 5.

The temperature of the second temperature measuring point T2 gradually rises with a time lag from the temperature of the first temperature measuring point T1, by the heat transfer from the first machining point P1 by the first beam B1.

Using as a trigger the fact that the temperature of the first temperature measuring point T1 is kept in the predetermined temperature range for the predetermined time (step S202—Yes), the controller 16 starts the radiation of the second beam B2 from the second light source 14 (step S205). Here, since the radiation of the first beam B1 from the first light source 12 is maintained, the temperature of the first temperature measuring point T1 is kept in the predetermined range.

By the heat input to the second machining point P2 by the radiation of the second beam B2 with a proper intensity, the temperature of the second temperature measuring point T2 rises and exceeds the melting temperature. When the controller 16 determines that the temperature of the second temperature measuring point T2 does not exceed the melting temperature (step S206-No), the controller 16 determines whether the intensity of the first beam B1 emitted from the first light source 12 and the intensity of the second beam B2 emitted from the second light source 14 are proper or not (step S207). If the intensities are not proper and intensity adjustment is needed (step S207—Yes), the controller 16 adjusts the intensity of the first beam B1 emitted from the first light source 12 and the intensity of the second beam B2 emitted from the second light source 14 (step S208). If the intensities are proper and intensity adjustment is not needed (step S207—No), the controller 16 keeps the intensity of the first beam B1 emitted from the first light source 12 and the intensity of the second beam B2 emitted from the second light source 14.

When the controller 16 determines that the temperature of the second temperature measuring point T2 exceeds the melting temperature (step S206—Yes), the controller 16 determines that a through-hole was formed, and starts the movement of the work 8 by the state 36 (step S209).

The controller 16 determines whether the stage 36 has moved by the preset distance and the stage 36 has reached the end point of the movement of the stage 36 (step S210). When the controller 16 determines that the stage 36 has not reached the end point of the movement of the stage 36 (step S210—No), the controller 16 determines whether the temperature of the first temperature measuring point T1 is kept in the predetermined range and the temperature of the second temperature measuring point T2 exceeds the melting temperature (step S211).

When the controller 16 determines that the temperature of the second temperature measuring point T2 exceeds the melting temperature (step S211—Yes), the controller 16 returns to step S210.

When the controller 16 determines that the temperature of the second temperature measuring point T2 does not exceed the melting temperature (step S211—No), the controller 16 determines whether the intensity of the first beam B1 emitted from the first light source 12 and the intensity of the second beam B2 emitted from the second light source 14 are proper or not (step S212). If the intensities are not proper and intensity adjustment is needed (step S212—Yes), the controller 16 adjusts the intensity of the first beam B1 emitted from the first light source 12 and the intensity of the second beam B2 emitted from the second light source 14 (step S213). If the intensities are proper and intensity adjustment is not needed (step S212—No), the controller 16 returns to the determination in step S211.

The adjustment in step S213 of the intensity of the first beam B1 emitted from the first light source 12 includes repeating the emission and the stop of emission such that the temperature of the first temperature measuring point T1 is kept in the predetermined range.

When the controller 16 determines that the stage 36 has reached the end point of the movement of the stage 36 (step S210—Yes), the controller 16 determines that a through-hole of a preset length was formed, and stops the output of the first beam B1 from the first light source 12 and the output of the second beam B2 from the second light source 14.

In this manner, the controller 16 radiates the first beam B1 of the first light source 12 onto the first machining point P1 and stops the radiation, and starts the radiation of the second beam B2 of the second light source 14 onto the second machining point P2, and moves the stage 36 from a time point when the temperature of the second temperature measuring point T2 exceeds the melting temperature. With the movement of the stage 36, the first machining point P1 and second machining point P2 move. At this time, the controller 16 continues the radiation of the first beam B1 on the first machining point P1, or repeats the radiation and the stop of radiation, thereby making the temperature of the first temperature measuring point T1 closer to the melting temperature.

In the state in which the temperature of the second temperature measuring point T2 is made closer to the melting point by the radiation of the first beam B1, the controller 16 continues the radiation of the second beam B2 on the second machining point P2, and forms a through-hole of a straight-line shape. At this time, the controller 16 adjusts the radiation intensity of the second beam B2 from the second light source 14, based on the temperature measurement values measured by the temperature monitors 32 and 34.

The first beam B1 and the second beam B2 are opposed to each other, with the work 8 being interposed, and the first beam spot diameter of the first beam B1 is greater than the second beam spot diameter of the second beam B2. Thus, even while the work 8 is being moved, the temperature of the second machining point P2 of the front surface 8*b*, which is located on the opposite side to the back surface 8*a* of the work 8, can easily be raised to the neighborhood of the melting temperature by the radiation of the first beam B1 on the first machining point P1.

The controller 16 may stop the emission of the first beam B1 from the first light source 12 immediately before a through-hole of a desired length is formed in the work 8.

In this case, a straight-line-shaped hole with a width of 0.5 mm, which is the diameter of the second beam B2, is formed, for example, by a length of a scan amount by the stage 36.

Note that also when the scan direction of the work 8 is changed from the right direction (+X direction) on the drawing sheet of FIG. 3 to the left direction (−X direction) on the drawing sheet, the optical machining apparatus 10 functions similarly as described above.

Figure 6:
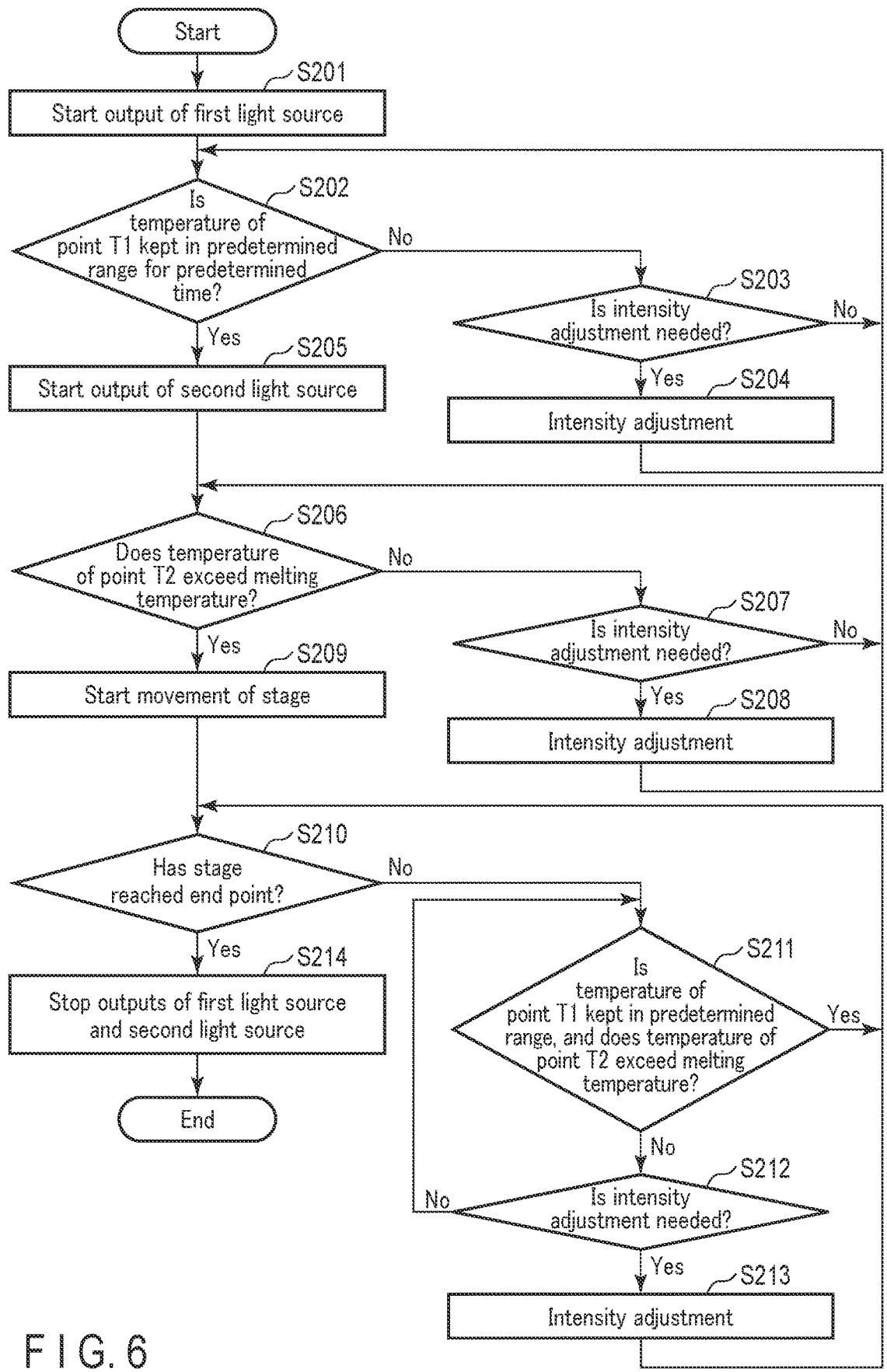
FIG. 6 is a flowchart in a case of machining a moving work by using the optical machining apparatus according to the second embodiment.

In FIG. 6, the control flow of the optical machining apparatus 10 in the case of moving the work 8 by the stage 36 was described. The control flow shown in FIG. 6 can be used in the case of forming, for example, a through-hole in the state in which the work 8 is fixed.

In addition, the first beam spot diameter of the first beam B1 may be less than the second beam spot diameter of the second beam B2. In this case, it is assumed that the first beam B1 is located on a positive-direction side with respect to the scan direction, compared to the second beam B2. Specifically, the radiation position of the first beam B1 may be displaced from the optical axis O2 of the second beam B2. In this case, the second machining point P2 is preheated by heat transfer.

In the present embodiment, it is assumed that the work 8 is a metallic plate member (e.g. an aluminum alloy) having a proper heat conductivity. The metallic plate member that is the work 8 has a proper heat conductivity, and, even when the first temperature measuring point T1 is distant by the proper distance D from the first machining point P1, the temperature of the first temperature measuring point T1 begins to rise with a small time difference. Thus, the optical machining apparatus 10 can properly machine the work 8, while using the temperature measurement value for the control at the time of machining by the optical machining apparatus 10.

Accordingly, the optical machining apparatus 10 can reduce the occurrence of a spatter due to the melting of the second machining point P2 of the work 8. In addition, when machining the work 8, the optical machining apparatus 10 can reduce the occurrence of dross due to the melting of the second machining point P2 of the work 8.

(Modification of the Second Embodiment)

Figure 7:
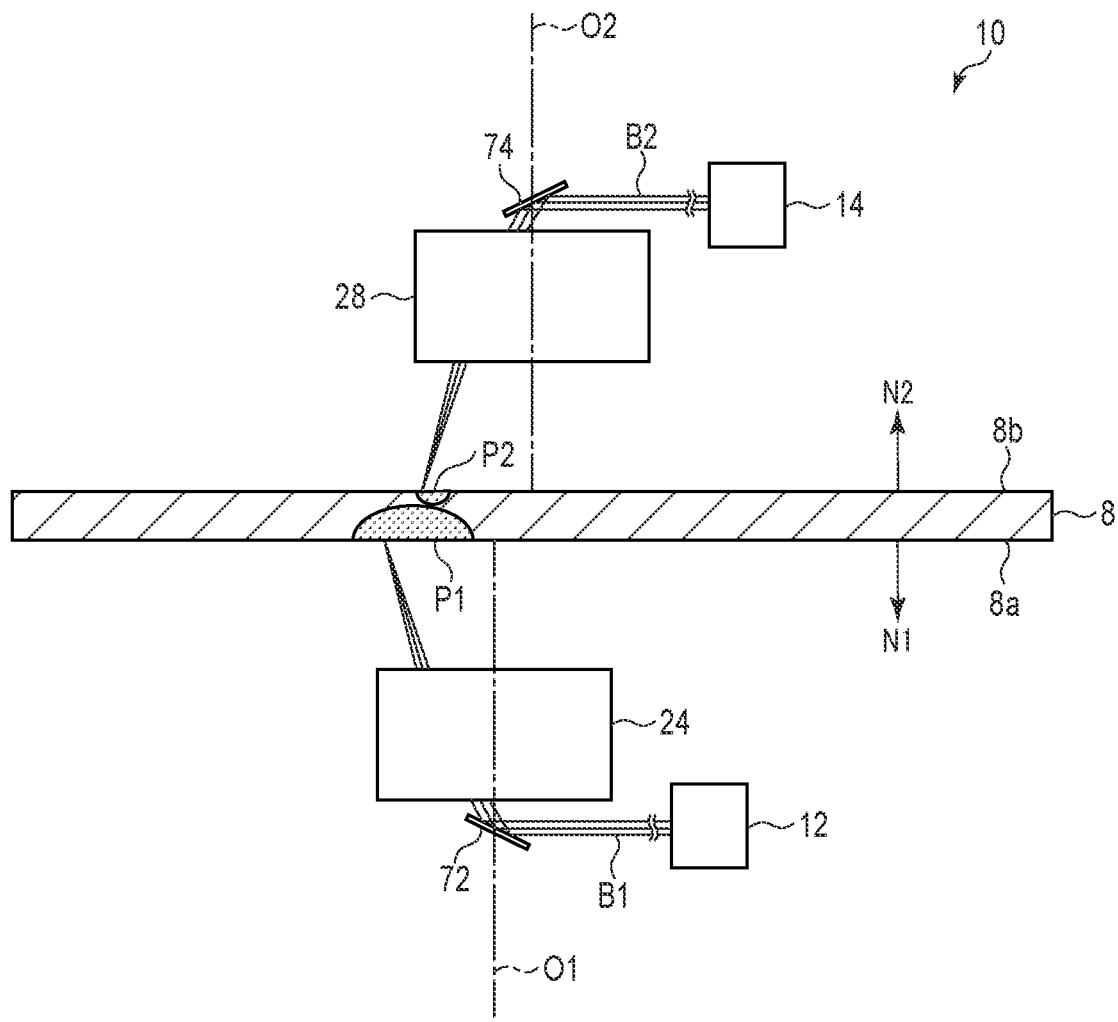
FIG. 7 is a schematic view illustrating a state in which a work is being machined by using an optical machining apparatus according to a modification of the second embodiment.

As illustrated in FIG. 7, the optical machining apparatus 10 includes a first light source 12, a second light source 14, a first condensing lens 24, a first Galvano-mirror 72, a second condensing lens 28, and a second Galvano-mirror 74.

The first Galvano-mirror 72 is disposed between the first light source 12 and the first condensing lens 24. The second Galvano-mirror 74 is disposed between the second light source 14 and the second condensing lens 28. The first Galvano-mirror 72 and second Galvano-mirror 74 are controlled by the controller 16 shown in FIG. 1 to FIG. 3. Thus, the first beam B1 is scanned by the first Galvano-mirror 72. The second beam B2 is scanned by the second Galvano-mirror 74. The first machining point (first position) P1 on which the first beam B1 is radiated, and the second machining point (second position) P2 on which the second beam B2 is radiated, are controlled by the controller 16 so as to move while keeping such a positional relationship that the first machining point P1 and the second machining point P2 are located on surfaces of substantially opposite sides with respect to the work 8.

In this case, the optical machining apparatus 10 does not need to scan the work 8. Thus, in the present modification, the stage 36 described in the second embodiment is not needed. In the present modification, the first beam B1 from the first light source 12 and the second beam B2 from the second light source 14 can be quickly scanned, compared to the case of scanning the work 8 by using, for example, the stage 36. Accordingly, the optical machining apparatus 10 of the present modification can quickly perform machining, compared to the case of scanning the work 8 by using, for example, the stage 36.

In the optical machining apparatus 10 of the present modification illustrated in FIG. 7, the Galvano-mirrors 72 and 74 for the first beam B1 and second beam B2 are independently disposed. The optical machining apparatus 10 may properly scan the first beam B1 and second beam B2 by operating one Galvano-mirror (not shown).

Third Embodiment

Hereinafter, an optical machining apparatus 10 according to a third embodiment will be described with reference to FIG. 8.

Figure 8:
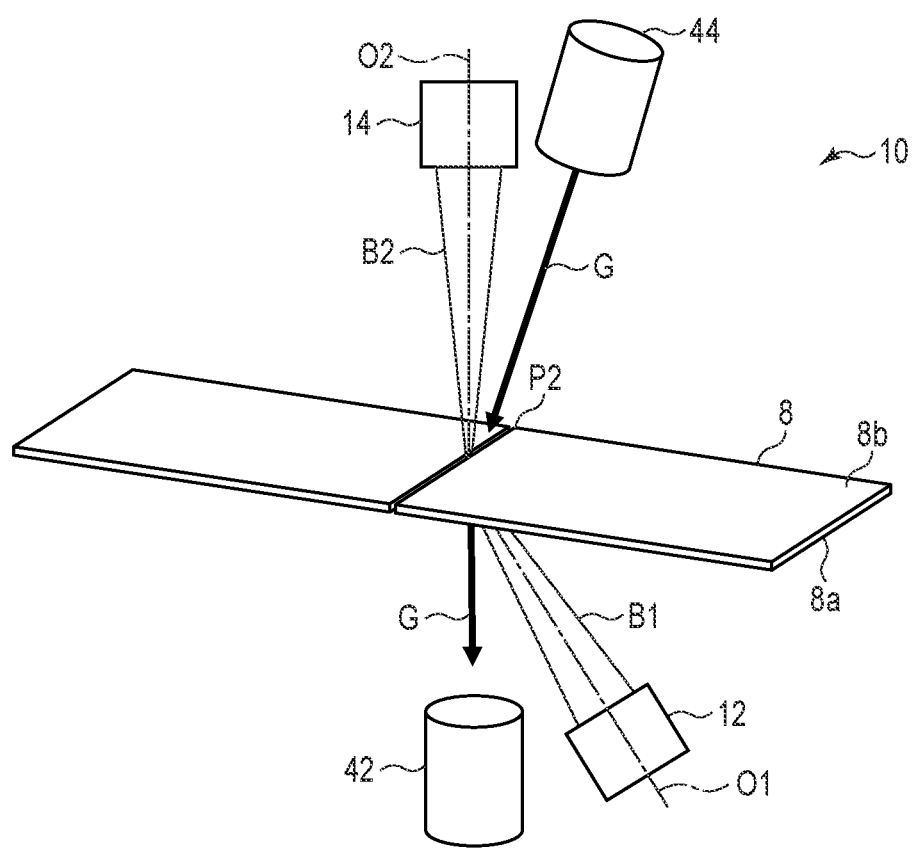
FIG. 8 is a schematic perspective view illustrating a state in which a work is being machined by using an optical machining apparatus according to a third embodiment.

FIG. 8 is a schematic perspective view of the optical machining apparatus 10 of the third embodiment. The optical machining apparatus 10 of this embodiment includes a first light source 12, a second light source 14, and a controller 16 (see FIG. 1 to FIG. 3). The optical machining apparatus 10 further includes a first assist gas port 42 and a second assist gas port 44.

The first assist gas port 42 is provided on the back surface 8*a* side of the work 8. The first assist gas port 42 is used, for example, as an assist gas suction portion. The second assist gas port 44 is provided on the front surface 8*b* side of the work 8. The second assist gas port 44 is used, for example, as an assist gas jet portion. The controller 16 controls a jet timing, a flow rate and the like of an assist gas G which is jetted from the second assist gas port 44. The controller 16 controls a suction timing, a suction rate and the like of the gas G in the first assist gas port 42.

The assist gas G is jetted from the second assist gas port 44, and creates an assist gas atmosphere at the second machining point P2. In most cases, oxygen gas is used as the gas that is used as the assist gas G, but nitrogen gas may also be used. Since the oxidation reaction heat of the oxygen gas can be utilized for the cutting of a metal, the oxygen gas can improve a cutting speed and criteria of stable machining. When the oxygen gas is used as the assist gas G, an oxidation coating film is formed on a cut surface. Thus, when cutting is performed without forming an oxidation coating film, other gas such as nitrogen gas or argon gas is used. The optical machining apparatus 10 purges and covers the second machining point P2 of the work 8 with the assist gas G, and can improve the machining precision of the work 8 by adjusting the degree of oxidation of the second machining point P2.

A device that jets the assist gas G, which is the second assist gas port 44, may be a device which generates a high-speed gas flow for blowing off a metal that is melted by the heat input of the second beam B2. The second assist gas port 44 is composed of, for example, a gas cylinder and a gas pressure adjuster (regulator). The capability of blowing off the molten metal at the time of machining the work 8 varies depending on the pressure of the assist gas G, and the size and settings of the second assist gas port (nozzle for cutting) 44.

When cutting machining for cutting the second machining point P2 of the work 8 is performed, the assist gas G may be sucked from the first assist gas port 42. In this case, the assist gas G, which is jetted from the second assist gas port 44, flows through the second machining point P2 toward the first assist gas port 42. By the formation of the flow path of the assist gas G, the spatter or dross occurring at the second machining point P2 can be removed together with the assist gas G.

Here, the temperature of the first machining point P1 of the back surface 8a of the work 8 is raised by the first beam B1. Thus, the tapering on the back surface 8a side of the flow path of the assist gas G, which is formed by the cutting of the work 8, can be reduced. Thereby, the assist gas G can easily from the second assist gas port 44 to the first assist gas port 42.

Note that the positions of the first assist gas port (assist gas suction portion) 42 and the second assist gas port (assist gas jet portion) 44 may be interchanged. Alternatively, both the first assist gas port 42 and the second assist gas port 44 may be formed as assist gas jet portions.

(Modification of the Third Embodiment)

Hereinafter, an optical machining apparatus 10 according to a modification of the third embodiment will be described with reference to FIG. 9. The main structure of the optical machining apparatus 10 of this modification is basically the same as that of the optical machining apparatus 10 of the third embodiment.

Figure 9:
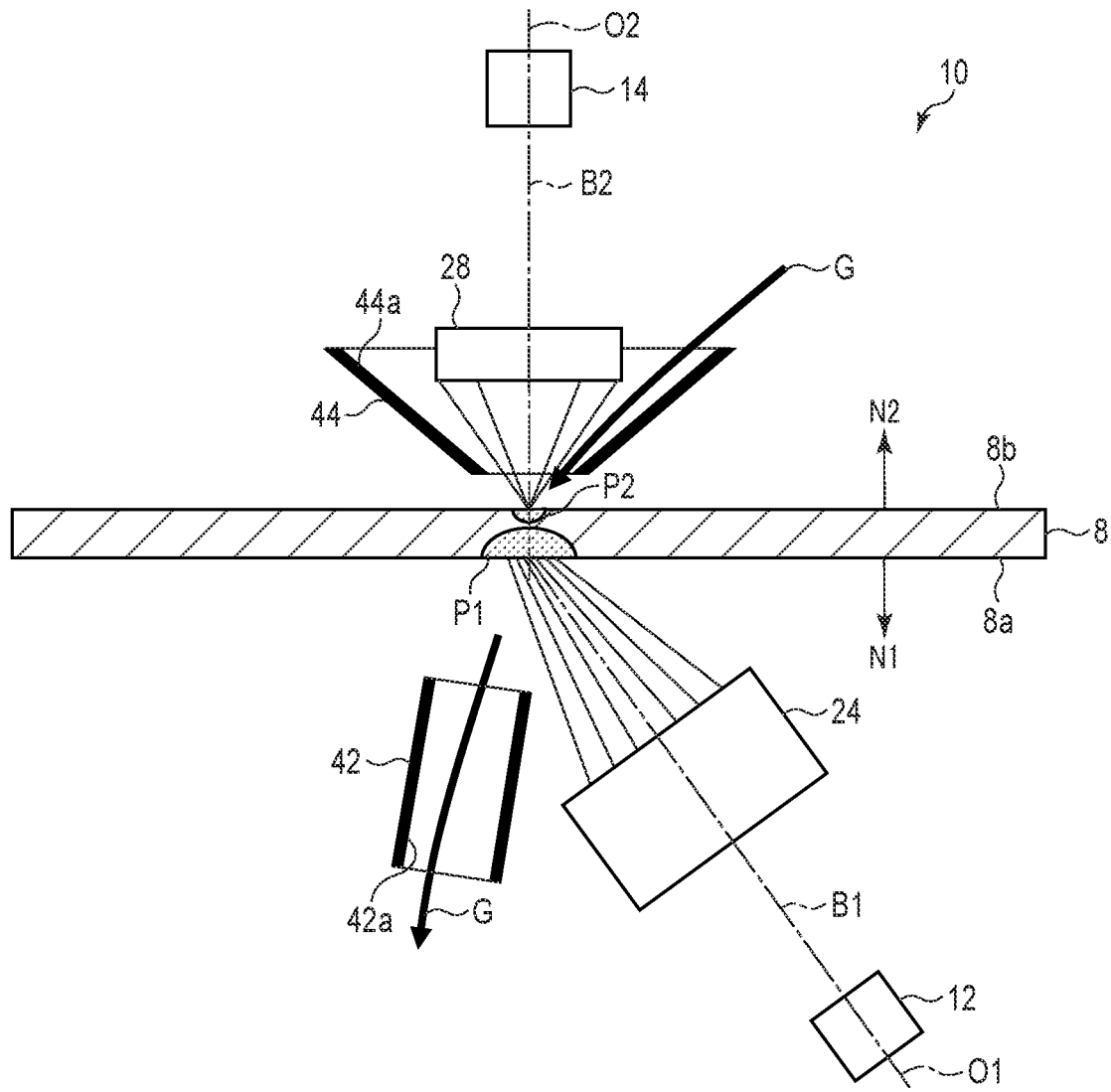
FIG. 9 is a schematic view illustrating a state in which a work is being machined by using an optical machining apparatus according to a modification of the third embodiment.

FIG. 9 is a schematic view of the optical machining apparatus 10 according to the modification of the third embodiment. The optical machining apparatus 10 includes a first condensing lens 24 on the optical path of the first beam B1. The optical machining apparatus 10 includes a second condensing lens 28 on the optical path of the second beam B2. The optical axis O1 of the first condensing lens 24 is inclined to the normal line N1 of the work 8. The optical axis O2 of the second condensing lens 28 extends along the normal line N2 of the work 8.

A first assist gas port 42 is provided on the back surface 8a side of the work 8. The first assist gas port 42 is used, for example, as an assist gas suction portion. A second assist gas port 44 is provided on the front surface 8b side of the work 8. The second assist gas port 44 is used, for example, as an assist gas jet portion.

The first assist gas port 42 includes a first nozzle wall surface 42a. The optical axis O1 of the first light source 12 is inclined to the normal line N1 of the back surface 8a including the first machining point (first position) P1 of the work 8.

The second assist gas port 44 includes a second nozzle wall surface 44a. The second condensing lens 28 is provided in the inside of the second nozzle wall surface 44a of the second assist gas port 44. The assist gas G is supplied to the second machining point P2 through between the second condensing lens 28 and the second nozzle wall surface 44a. Thus, the optical axis O2 of the second beam B2 from the second light source 14 can be made to agree with the center axis of the second assist gas port 44.

The spot of the first beam B1 is, for example, rectangular, and a perpendicular direction to the drawing sheet of FIG. 9 is the long side of the rectangular shape. The first assist gas port 42 may be rectangular accordingly. However, the shape of the spot of the first beam B1 is not limited to this.

The spot of the second beam B2 is, for example, rectangular, and a perpendicular direction to the drawing sheet of FIG. 9 is the long side of the rectangular shape. The second assist gas port 44 may be rectangular accordingly. However, the shape of the spot of the second beam B2 is not limited to this.

The first optical axis O1 of the first beam B1 is inclined to the back surface 8a of the work 8. Thus, the first assist gas port 42 on the back surface 8a side of the work 8 and the second assist gas port 44 on the front surface 8b side of the work 8 can be substantially opposed to each other, with the work 8 being interposed therebetween. Thereby, the assist gas B can easily flow from the front surface 8b side to the back surface 8a side, with the machining of the work 8. Accordingly, the spatter or dross occurring when the work 8 is machined can easily be eliminated by using the optical machining apparatus 10 of the present modification.

Fourth Embodiment

Hereinafter, an optical machining apparatus 10 according to a fourth embodiment will be described with reference to FIG. 10 and FIG. 11.

The optical machining apparatus 10 of the present embodiment includes a first light source 12, a second light source 14, and a controller 16 (see FIG. 1 to FIG. 3). The optical machining apparatus 10 further includes a first collector 62 and a second collector 64. It is preferable that the present embodiment further includes a temperature monitor (infrared camera) 34 (see FIG. 3) which measures, in a non-contact manner, the temperature of the temperature measuring point T2 which is a position that is distant, by the predetermined distance D, from the second machining point P2 of the front surface 8b of the work 8.

Figure 10:
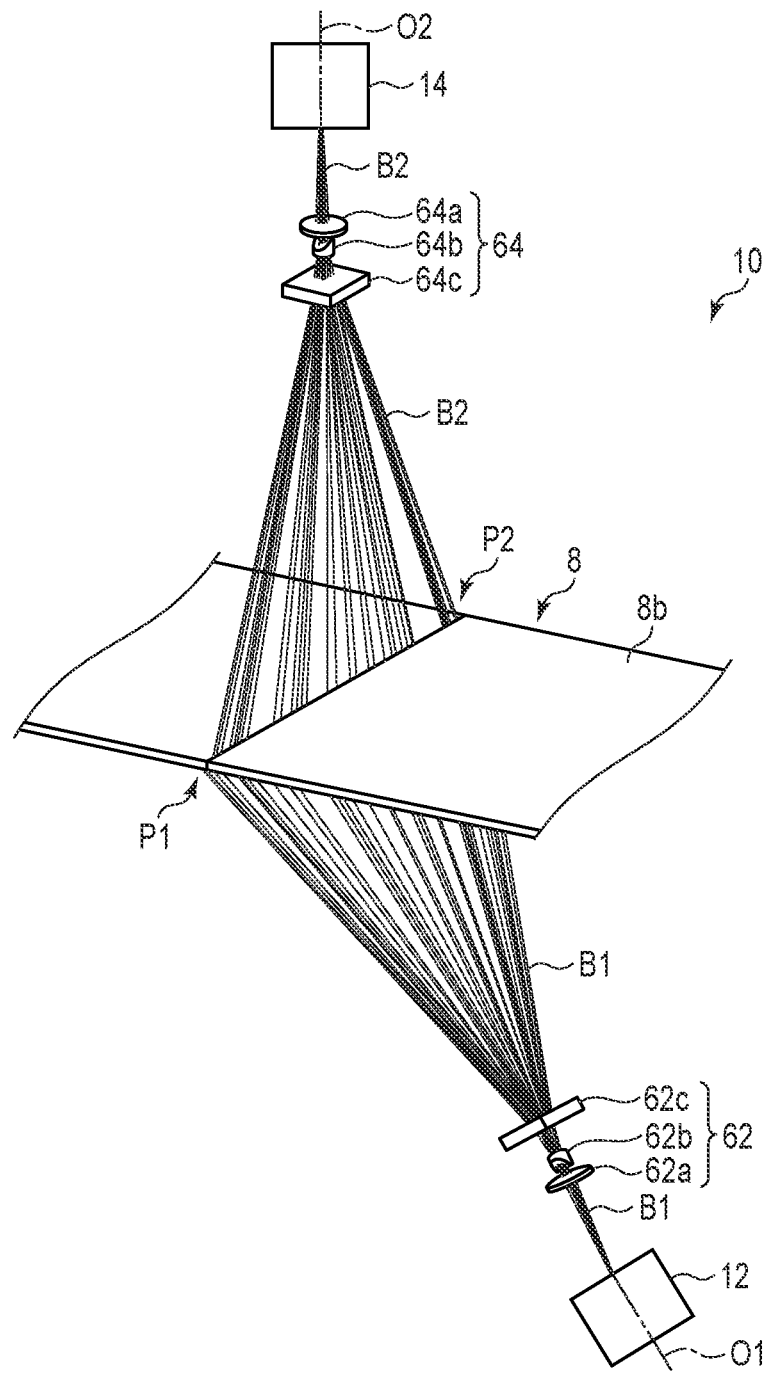
FIG. 10 is a schematic perspective view illustrating a state in which a work is being machined by using an optical machining apparatus according to a fourth embodiment.
Figure 11:
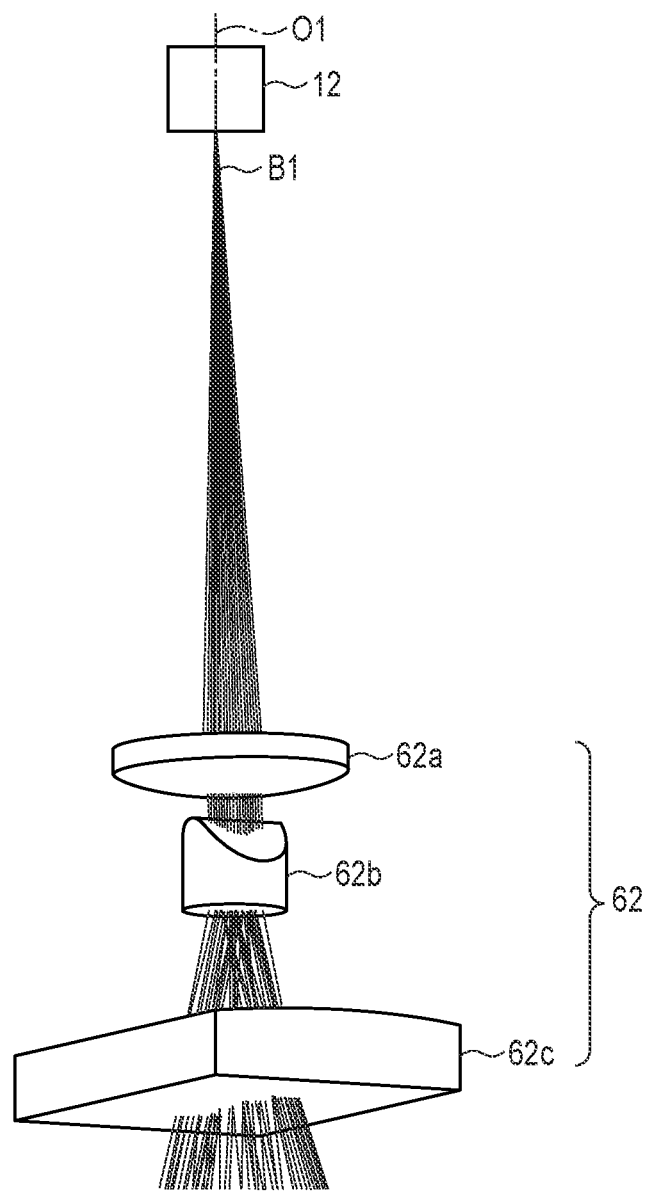
FIG. 11 is a schematic perspective view illustrating a diffusion state of a beam from a first light source of the optical machining apparatus according to the fourth embodiment.

FIG. 10 is a perspective view of the first collector 62 and second collector 64 of the fourth embodiment. FIG. 11 is an enlarged perspective view of the first collector 62 in FIG. 10 of the fourth embodiment.

Here, in the present embodiment, it is assumed that the first beam B1 and second beam B2 are laser beams. The first light source 12 may be a light emission surface of a solid-state laser, or may be an emission end face of a fiber laser. The second light source 14 may be a light emission surface of a solid-state laser, or may be an emission end face of a fiber laser.

The first collector 62 includes a first lens 62a, a second lens (first optical element) 62b, and a third lens (second optical element) 62c. The first lens 62a is disposed on the optical path of the first beam B1 which is emitted from the first light source 12. The second lens 62b is disposed on the optical path of the first beam B1 emanating from the first lens 62a. The third lens 62c is disposed on the optical path of the first beam B1 emanating from the second lens 62b.

The first lens 62a condenses light rays emitted from the first light source 12 to a parallel beam (parallel light rays). The first lens 62a may be, for example, a convex lens.

The second lens 62b condenses the parallel beam to diffusion light which diffuses in one axial direction. Specifically, the second lens 62b changes the beam shape at the first machining point (first position) P1 of the first beam B1, which is emitted from the first light source 12, into a straight-line shape extending in one axial direction which is an arbitrary first axial direction on the back surface 8a of the work 8, the one axial direction being one of the arbitrary first axial direction and a second axial direction orthogonal to the first axial direction. As the second lens 62b, for example, a Powell lens is used.

The third lens 62c keeps the diffusion state of the diffusion light which diffuses in one axial direction, and collects the light in direction orthogonal to the diffusion light. The third lens 62c is provided between the second lens 62b and the work 8, and collects the first beam B1, which is diffused by the second lens 62b in the second axial direction, into the first axial direction. As the third lens 62c, for example, a cylindrical lens is used.

From the above, the first beam B1 emitted from the first light source 12 successively passes through the first lens 62a, second lens 62b and third lens 62c, thus forming a rectangular beam spot on the back surface 8a of the work 8. When the short side of the rectangular shape is sufficiently small, the beam spot shape of the first beam B1 on the back surface 8a of the work 8 can be regarded as a straight-line shape.

Similarly, the second collector 64 includes a first lens 64a, a second lens (third optical element) 64b, and a third lens (fourth optical element) 64c.

The first lens 64a condenses light rays emitted from the second light source 14 to a parallel beam (parallel light rays). The first lens 64a may be, for example, a convex lens.

The second lens 64b condenses the parallel beam to divergent light which diverges in one axial direction. Specifically, the second lens 64b changes the beam shape at the second machining point (second position) P2 of the second beam B2, which is emitted from the second light source 14, into a straight-line shape extending in one axial direction which is a third axial direction that is parallel to the first axial direction described in connection with the first collector 62, the one axial direction being one of the third axial direction and a fourth axial direction orthogonal to the third axial direction. As the second lens 64b, for example, a Powell lens is used.

The third lens 64c keeps the divergent state of the divergent light which diverges in one axial direction, and condenses the light in direction orthogonal to the divergent light. The third lens 64c is provided between the second lens 64b and the work 8, and condenses the second beam B2, which is diverged by the second lens 64b and is divergent in the fourth axial direction, into the third axial direction. As the third lens 64c, for example, a cylindrical lens is used.

From the above, the second beam B2 emitted from the second light source 14 successively passes through the first lens 64a, second lens 64b and third lens 64c, thus forming a rectangular beam spot on the front surface 8b of the work 8. When the short side of the rectangular shape is sufficiently small, the beam spot shape of the second beam B2 can be regarded as a straight-line shape.

In this manner, when the beam spot of the beam B1, B2 is rectangular, and when the long side of the divergent light of the beam B1, B2 is sufficiently large relative to the work 8 and the beams B1 and B2 are radiated on positions which are opposed to each other with the work 8 being interposed, the work 8 is heated in a substantially straight-line shape as the first machining point P1, and the work 8 is heated in a substantially straight-line shape as the second machining point P2. The straight-line-shaped second machining point P2 is heated (preheated) up to the neighborhood of the melting temperature by the first beam B1, and the straight-line-shaped second machining point P2 can be cut in a substantially straight-line shape by the radiation of the second beam B2. Accordingly, the optical machining apparatus 10 of the present embodiment can machine the work 8 by a machining distance of a proper length, without scanning the first beam B1 and second beam B2 relative to the work 8. In other words, when cutting machining is performed by using the optical machining apparatus 10 of the present embodiment, the work 8 can be cut by one time or a small number of times of beam radiation, without scanning the first beam B1 and second beam B2.

When the optical machining apparatus 10 includes the temperature monitor (infrared camera) 34 (see FIG. 3), the controller 16 may cause the first light source 12 to emit the first beam B1 while monitoring the temperature of the temperature measuring point T2, and may then cause the second light source 14 to emit the second beam B2. Thereby, the optical machining apparatus 10 can perform machining, such as cutting, while keeping the temperature of the work 8 at a proper temperature.

The controller 16 can perform the radiation of the first beam B1 and the radiation of the second beam B2, as described in the first embodiment and the second embodiment. In this case, the optical machining apparatus 10 does not require the temperature monitor 34.

Accordingly, when machining the work 8, the optical machining apparatus 10 can reduce the occurrence of a spatter due to the melting of the second machining point P2 of the work 8. In addition, when machining the work 8, the optical machining apparatus 10 can reduce the occurrence of dross due to the melting of the second machining point P2 of the work 8.

Note that the first lens 62a of the first collector 62 is unnecessary if the first beam B1 is emitted as a parallel beam from the first light source 12. Similarly, the first lens 64a of the second collector 64 is unnecessary if the second beam B2 is emitted as a parallel beam from the second light source 14.

According to at least one of the above-described embodiments, there can be provided the optical machining apparatus 10 which can reduce the occurrence of a spatter at the time of machining the work 8.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical cutting apparatus comprising:
a first light source;
a second light source; and
a controller configured to control radiation of a first beam from the first light source and radiation of a second beam from the second light source,
wherein
the first light source is controlled by the controller to radiate the first beam onto a first position of a surface of a work in such a manner as to transfer heat by absorption of the first beam at the first position of the surface of the work at a temperature lower than a melting temperature of the work from the first position of the surface of the work to a second position of a surface of the work on an opposite side to the first position; and the second light source is controlled by the controller to radiate the second beam onto the second position such that a temperature of the work exceeds the melting temperature of the work in order to cut the work between the first position and the second position, in a state in which a temperature of the second position is raised by the transfer of the heat, a first optical axis of the first beam is oblique with respect to a normal of the work, a second optical axis of the second beam is not oblique as much as that of the first beam, and an angle between the first optical axis and the second optical axis is defined such that the first light source of the first beam is prevented from being irradiated with the second beam.

2. The optical cutting apparatus of claim 1, wherein;

the controller is configured to cause the second light source to radiate the second beam in accordance with the transfer of the heat to the second position by the radiation of the first beam from the first light source onto the first position.

3. The optical cutting apparatus of claim 2, wherein:

the controller is configured to control a radiation timing of the first beam from the first light source and a radiation timing of the second beam from the second light source, and the controller is configured to adjust the radiation timing of the first beam from the first light source and the radiation timing of the second beam from the second light source, based on information of the work.

4. The optical cutting apparatus of claim 2, further comprising:

a temperature monitor configured to measure a surface temperature of a position which is distant, by a predetermined distance, from the second position of the work, wherein the controller is configured to adjust a radiation intensity of the second beam from the second light source, based on a temperature measurement value measured by the temperature monitor.

5. The optical cutting apparatus of claim 2, wherein the controller is configured to control the first position on which the first beam is radiated, and the second position on which the second beam is radiated, in such a manner as to keep a positional relationship between the first position and the second position.

6. The optical cutting apparatus of claim 1, wherein a first beam spot diameter of the first beam at the first position is made greater than a second beam spot diameter of the second beam at the second position.

7. The optical cutting apparatus of claim 1, wherein a first wavelength of the first beam is different from a second wavelength of the second beam, and is set to have a higher absorptivity to the work prior to melting, than the second wavelength.

8. The optical cutting apparatus of claim 1, further comprising:

a first collector including a first optical element which is provided between the first light source and the work and is configured to diffuse a beam shape at the first position of the first beam, which is emitted from the first light source, into a straight-line shape extending in a first axial direction orthogonal to a second axial direction; and a second collector including a second optical element which is provided between the second light source and the work and is configured to diffuse a beam shape at the second position of the second beam, which is emitted from the second light source, into a straight-line shape extending in a third axial direction which is parallel to the first axial direction, and which is orthogonal to a fourth axial direction.

9. The optical cutting apparatus of claim 8, wherein:

the first collector includes a third optical element which is provided between the first optical element and the work and is configured to collect the first beam, which is diffused by the first optical element in the second axial direction, into the first axial direction, and the second collector includes a fourth optical element which is provided between the second optical element and the work and is configured to collect the second beam, which is diffused by the second optical element in the fourth axial direction, into the third axial direction.

10. The optical cutting apparatus of claim 1, further comprising:

a first assist gas port provided on a side of the first position of the work and configured to jet or suction a gas; and a second assist gas port provided on a side of the second position of the work and configured to jet or suction the gas, wherein:

an optical axis of the first light source is inclined to a normal line of a surface including the first position of the work, and the first assist gas port and the second assist gas port are opposed to each other, with the work being interposed therebetween.

11. The optical cutting apparatus of claim 1, wherein the second optical axis of the second beam has different directions with respect to the normal of the workpiece.

12. The optical cutting apparatus of claim 1, wherein:

a beam shape of the first beam on the first position of the surface of the work is an ellipse, a length of a major axis of the ellipse being a diameter of the first beam, a beam shape of the second beam on the second position of the surface of the work is a circle, and the diameter of the first beam on the first position of the surface of the work is greater than a diameter of the second beam on the second position of the surface of the work.

13. The optical cutting apparatus of claim 1, wherein the first light source and the second light source are configured such that the first beam enables the transfer of the heat toward a wider area of the work in comparison with that of the second beam.

14. The optical cutting apparatus of claim 1, wherein the second optical axis of the second beam is orthogonal to a front surface of the work.

15. The optical cutting apparatus of claim 1, wherein:

the first light source faces the first position of the surface of the work, and the second light source faces the second position of the surface of the work on the opposite side to the first position.

* * * * *